UNITED STATES PATENT OFFICE.

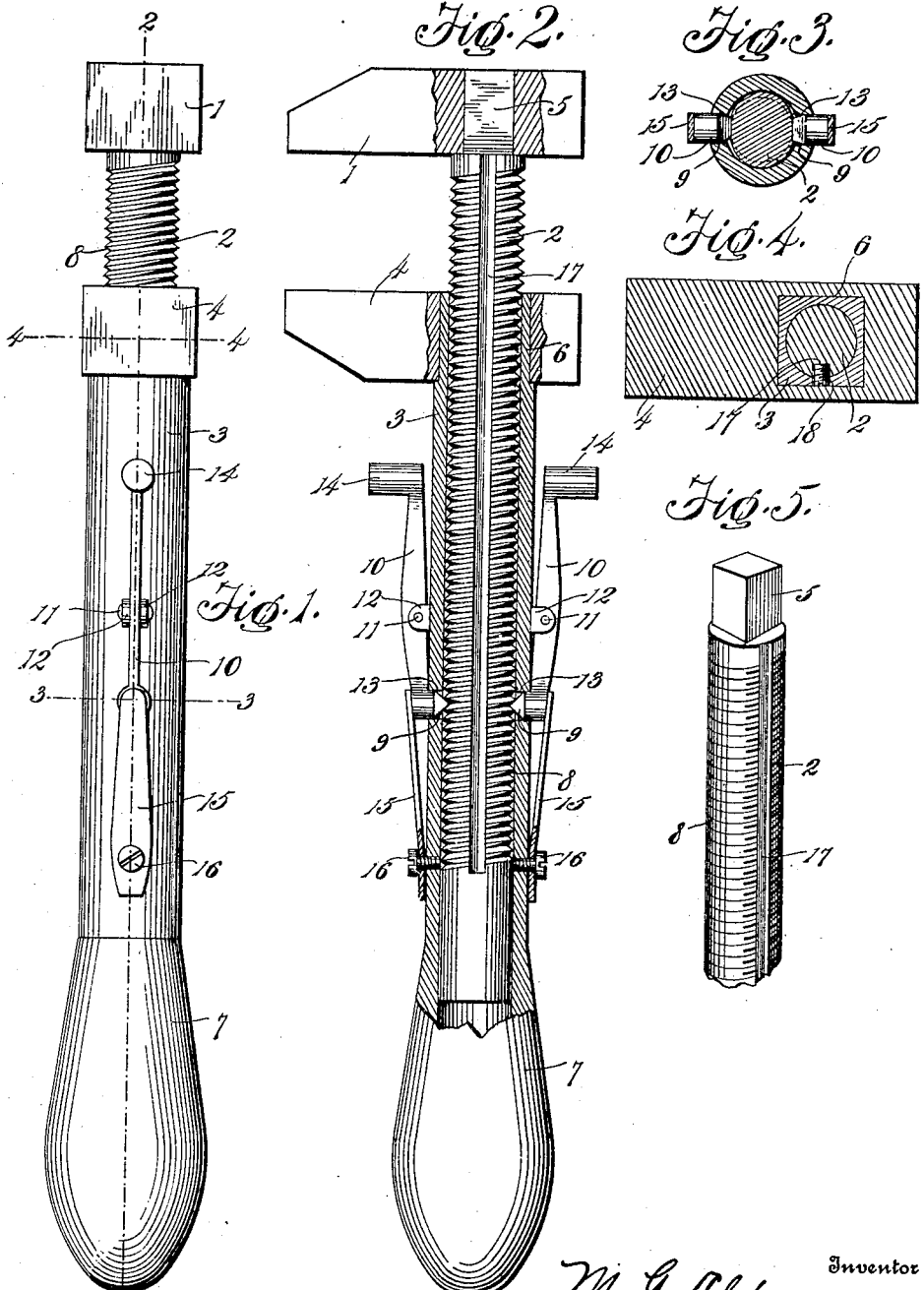

MITCHELL G. ALBANAKI, OF ENID, OKLAHOMA.

WRENCH.

No. 913,346.    Specification of Letters Patent.    Patented Feb. 23, 1909.

Application filed July 20, 1908. Serial No. 444,503.

*To all whom it may concern:*

Be it known that I, MITCHELL G. ALBANAKI, having filed in the District Court of Garfield county, Oklahoma, my declaration of intention to become a citizen of the United States, residing at Enid, in the county of Garfield and State of Oklahoma, have invented certain new and useful Improvements in Wrenches, of which the following is a specification, reference being had to the accompanying drawings.

This invention relates to improvements in wrenches, and consists of the novel features of construction and the combination and arrangement of parts hereinafter fully described and claimed.

The object of the invention is to provide a simple and practical quick adjustment wrench which will be strong and durable and comparatively inexpensive.

The above and other objects of the invention are attained in its preferred embodiment illustrated in the accompanying drawings, in which—

Figure 1 is a side elevation of the improved wrench; Fig. 2 is a view partly in section, the plane of the parts in section being indicated by the line 2—2 in Fig. 1; Figs. 3 and 4 are detail cross sectional views taken respectively on the planes indicated by the lines 3—3 and 4—4 in Fig. 1; and Fig. 5 is a detail view of the shank of the movable jaw.

The invention comprises a movable jaw 1 fixed upon the outer end of a shank 2 which is slidable in the tubular shank 3 of a co-acting stationary jaw 4. The jaw 1 has a squared opening to receive the reduced squared outer end 5 of the movable shank 2; and the stationary jaw 4 has a similar squared opening to receive the similar-shaped reduced end 6 of the tubular shank 3. The latter is of cylindrical form and has its opposite end provided with a stationary handle 7. The shank 2 is cylindrical in shape and externally screw threaded, as shown at 8, to provide serrations or ratchet teeth for the engagement of the beveled ends or teeth 9 of two pivoted dogs 10 carried by the shank 3. Said dogs 10 are in the form of levers pivoted intermediate their ends on pins 11 in forked outer ends of screw studs 12 which are tapped into the shank 3 at diametrically opposite points. The beveled ends or teeth 9 are formed at one end of the dogs 10 so as to project through oppositely disposed openings 13 formed in said shank 3 and the opposite ends of said dogs are formed with outwardly projecting finger pieces or buttons 14. Flat leaf springs 15 are secured by screws 16 to the shank 3 and have their free ends bearing against the ends 9 of the dogs to press the latter inwardly and into engagement with the ratchet teeth or screw threads 8. It will be seen that when the finger pieces or buttons 14 are pressed inwardly the beveled ends 9 of the dogs will be disengaged from the ratchet teeth so that the shank 2 may slide freely in the shank 3 to permit the movable jaw 1 to be moved toward or from the stationary jaw 4.

In order to prevent the shank 2 from rotating and to retain it in the shank 3, it is formed with a longitudinally extending groove 17 to receive the projecting inner end of a screw stud 18 tapped into the shank 3. The screw stud 18 is arranged in the squared upper end of the shank 3, over which end the stationary jaw 4 is secured so that said jaw serves to retain the screw in position.

Having thus described my invention what is claimed is:

1. A wrench comprising a tubular shank having a handle at one end, a squared portion at its opposite end and oppositely disposed apertures intermediate its ends, a second shank having an externally screw threaded portion to slide within the tubular shank and formed with a longitudinal groove extending along said threaded portion, a pin arranged in the squared end of the tubular shank and projecting into the groove in the threaded shank to prevent the latter from rotating, a stationary jaw arranged upon the squared end of the tubular shank and disposed over said pin to retain the latter in said shank, a movable jaw upon the outer end of the threaded shank and dogs carried by the tubular shank and projecting through said apertures therein and engaged with the screw threads of the other shank, substantially as described.

2. The herein described wrench comprising a tubular cylindrical shank having a handle at one end, a squared portion at its opposite end and oppositely disposed apertures intermediate its ends, a stationary jaw fixed upon the squared end of said shank, a second shank having an externally screw threaded portion to slide within the tubular shank and also formed with a longitudinal groove extending along its threaded portion and with a squared outer end, a movable jaw fixed upon the squared end of the screw threaded shank, a pin carried by the tubular shank and adapted to project into the groove in the screw threaded shank to prevent the latter from rotating, forked bearings arranged at diametrically opposite points upon the tubular shank, levers fulcrumed intermediate their ends in said bearings and formed at their upper or outer ends with outwardly projecting finger pieces and at their lower or inner ends with dogs having beveled or V-shaped inner ends, said dogs being adapted to project through said apertures in the tubular shank and to have their beveled ends engage the screw threads of the other shank, and leaf springs having their lower ends secured to the tubular shank and their upper or free ends bearing upon said dogs to force them inwardly against the screw threaded shank.

In testimony whereof I hereunto affix my signature in the presence of two witnesses.

MITCHELL G. ALBANAKI.

Witnesses:
  HOMER E. EVANS,
  JAMES B. ACUFF.